E. R. BERRY.
ARC LIGHT ELECTRODE.
APPLICATION FILED AUG. 6, 1909.
1,017,497.
Patented Feb. 13, 1912.
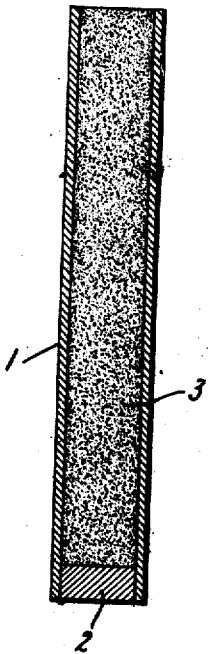
Witnesses:
Inventor.
Edward R. Berry,
by Albert H. Davis
Atty

UNITED STATES PATENT OFFICE.

EDWARD R. BERRY, OF LYNN, MASSACHUSETTS, ASSIGNOR TO GENERAL ELECTRIC COMPANY, A CORPORATION OF NEW YORK.

ARC-LIGHT ELECTRODE.

1,017,497.  Specification of Letters Patent.  Patented Feb. 13, 1912.

Application filed August 6, 1909. Serial No. 511,520.

*To all whom it may concern:*

Be it known that I, EDWARD R. BERRY, a citizen of the United States, residing at Lynn, county of Essex, State of Massachusetts, have invented certain new and useful Improvements in Arc-Light Electrodes, of which the following is a specification.

My invention has reference to improvements in arc light electrodes and is particularly applicable to an electrode made of titanium carbid mixture or containing a preponderating amount of titanium carbid; and my invention has for its aim the increase of the life of titanium carbid electrodes by incorporating in the body thereof a small percentage of chromium carbid.

My invention is based upon the discovery that whereas the addition of chromite or any other oxid of chromium to an electrode material that is wholly or largely composed of an oxid or oxids of metal, acts as a restrainer to the consumption of such electrode,—the addition of such oxid of chromium to an electrode material which is largely or preponderatingly composed of a material that is not an oxid of a metal, actually shortens the life of the same to a considerable extent; and that, on the other hand, the life of an electrode which is largely or wholly composed of a material that is not an oxid of a metal or metals, is lengthened by the addition thereto of non-oxidized chromium or chromium compound.

In the accompanying drawing I have illustrated in vertical section an electrode embodying my invention. In this drawing, 1 represents a metal shell or tube usually made of iron and 2 is a plug of any suitable material by which the lower end of the tube is closed. This tube has a filling 3 of the ordinary titanium carbid mixture, with the addition of a small percentage of chromium carbid. The addition to the titanium carbid mixture of even a small amount of chromium carbid quite noticeably increases the life of the electrode, and an increased amount of chromium carbid, up to five per cent., still further increases the life of the electrode without diminishing the candle power of the arc; in fact, with the addition of chromium carbid, up to five per cent., a slight increase of candle power is observed. A further increase of the percentage of chromium carbid, while still further increasing the life of the electrode, is accompanied by a slight decrease in the candle power. I have obtained the best results by using ninety-five and one-half per cent. of titanium carbid mixture and four and one-half per cent. of chromium carbid. While these proportions give the best results, I am not limited to the same, since the addition of chromium carbid in any amount to the titanium carbid increases the life of the electrode although a loss of light is experienced with the higher percentages.

What I claim as new and desire to secure by Letters Patent of the United States, is:—

1. An arc light electrode, containing a preponderating amount of titanium carbid and an admixture of chromium carbid.

2. A titanium carbid electrode, having distributed through its mass a small percentage of chromium carbid as a restrainer.

3. An arc light electrode material consisting of a titanium carbid mixture, and about one-half to five per cent. of chromium carbid.

4. An arc light electrode material consisting of ninety-five and one-half per cent. of titanium carbid mixture and four and one-half per cent. of chromium carbid.

5. An arc-light electrode containing a preponderating amount of non-oxidized titanium compound, and an admixture of non-oxidized chromium compound.

In witness whereof, I have hereunto set my hand this fourth day of August, 1909.

EDWARD R. BERRY.

Witnesses:
JOHN A. MCMANUS, Jr.,
CHARLES A. BARNARD.